(12) United States Patent
Bergmann

(10) Patent No.: US 10,252,823 B2
(45) Date of Patent: Apr. 9, 2019

(54) METHOD AND APPARATUS FOR ARRANGING A PLURALITY OF FOOD PRODUCTS IN THE BASE PART OF A PACKAGING

(71) Applicant: Weber Maschinenbau GmbH Breidenbach, Breidenbach (DE)

(72) Inventor: Marco Bergmann, Barssel (DE)

(73) Assignee: WEBER MASCHINEBAU GMBH BREIDENBACH, Breidenbach (DE)

( * ) Notice: Subject to any disclaimer, the term of this patent is extended or adjusted under 35 U.S.C. 154(b) by 1127 days.

(21) Appl. No.: 14/593,279

(22) Filed: Jan. 9, 2015

(65) Prior Publication Data
US 2015/0197353 A1    Jul. 16, 2015

(30) Foreign Application Priority Data
Jan. 13, 2014    (DE) .................. 10 2014 000 132

(51) Int. Cl.
*B65B 25/08*    (2006.01)
*B65B 25/06*    (2006.01)
(Continued)

(52) U.S. Cl.
CPC .................. *B65B 5/08* (2013.01); *B26D 7/32* (2013.01); *B65B 5/101* (2013.01); *B65B 5/12* (2013.01); *B65B 25/06* (2013.01); *B65B 35/24* (2013.01); *B65B 35/44* (2013.01); *B65B 43/52* (2013.01); *B65B 43/56* (2013.01); *B65B 43/62* (2013.01); *B65G 54/02* (2013.01); *B65B 61/28* (2013.01); *B65B 2220/14* (2013.01)

(58) Field of Classification Search
CPC ............................... B65B 25/06; B65B 25/08
(Continued)

(56) References Cited

U.S. PATENT DOCUMENTS 3,442,410 A * 5/1969 Solomonson ........ B65G 47/244
                                                         100/14
4,074,509 A    2/1978 Miles
(Continued)

FOREIGN PATENT DOCUMENTS

CH         521265 A      5/1972
DE      3711688 A1     10/1988
(Continued)

OTHER PUBLICATIONS

European Office Action for European Application No. 15150067.5-1708 dated Feb. 17, 2017, 5 pages.

*Primary Examiner* — Andrew M Tecco
*Assistant Examiner* — Eyamindae C Jallow
(74) *Attorney, Agent, or Firm* — Cantor Colburn LLP

(57) ABSTRACT

The invention relates to a method and to an apparatus for arranging a plurality of foods, in particular different types of cut meat products and sausage products, in at least one base portion of a packaging. The method is characterized in that the base portion receiving the foods is moved on a guide track, wherein magnetic fields are generated for moving the base portion; in that the cart is fed successively to food feeds of the individual foods; and in that at least one food is placed on or in the base portion at each food feed. The apparatus has at least two food feeds whose respective food transfer ends are arranged above a guide track on which carts which have packaging receivers having at least one receiving frame are movable by means of magnetic field sources.

16 Claims, 3 Drawing Sheets

Figure 1:
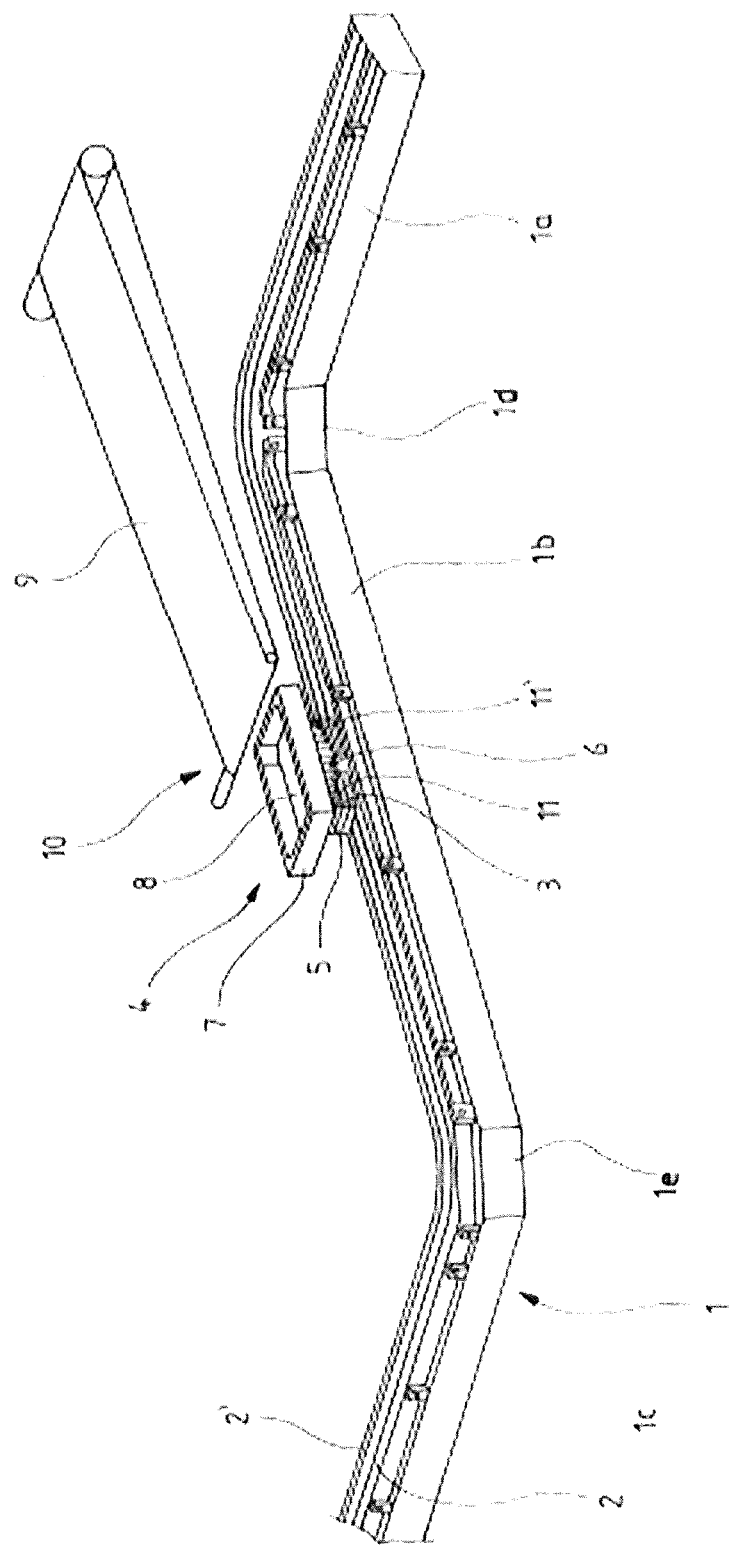

(51) Int. Cl.
*B65B 5/08* (2006.01)
*B26D 7/32* (2006.01)
*B65B 35/24* (2006.01)
*B65B 35/44* (2006.01)
*B65B 43/56* (2006.01)
*B65B 43/62* (2006.01)
*B65B 5/10* (2006.01)
*B65B 5/12* (2006.01)
*B65B 43/52* (2006.01)
*B65G 54/02* (2006.01)
*B65B 61/28* (2006.01)

(58) Field of Classification Search
USPC .. 198/377.02, 377.06, 392, 478.1, 608, 658, 198/394
See application file for complete search history.

(56) References Cited

U.S. PATENT DOCUMENTS

| | | | |
|---|---|---|---|
| 4,110,493 A * | 8/1978 | Loveless | B05B 13/0609 198/394 |
| 4,250,688 A * | 2/1981 | Lingenfelder | B65B 5/061 198/429 |
| 6,692,196 B1 | 2/2004 | Simm et al. | |
| 2011/0033583 A1 * | 2/2011 | Thomas | G11B 23/0321 426/121 |
| 2012/0031741 A1 | 2/2012 | Ishino et al. | |
| 2012/0159900 A1 * | 6/2012 | Grasselli | B65B 5/06 53/235 |
| 2013/0152871 A1 * | 6/2013 | Dewey | A01K 15/026 119/710 |
| 2013/0280393 A1 * | 10/2013 | Van Gerwen | A22C 7/0069 426/389 |
| 2013/0283733 A1 | 10/2013 | Py | |

FOREIGN PATENT DOCUMENTS

| | | | | |
|---|---|---|---|---|
| DE | 10043304 A1 | 9/2001 | | |
| DE | 102008019028 A1 | 10/2009 | | |
| DE | 102011110690 A1 | 2/2013 | | |
| EP | 2478771 A1 * | 7/2012 | | A22C 7/0069 |
| EP | 2614939 A1 | 7/2013 | | |
| JP | S60170401 A | 9/1985 | | |
| WO | 2014108287 A1 | 7/2014 | | |

* cited by examiner

METHOD AND APPARATUS FOR ARRANGING A PLURALITY OF FOOD PRODUCTS IN THE BASE PART OF A PACKAGING

CROSS-REFERENCES TO RELATED APPLICATIONS

This application claims priority to German patent application no. 102014000132.6, filed on Jan. 13, 2014, the content of which is incorporated herein by reference, in its entirety.

The invention relates to a method and to an apparatus for arranging a plurality of foods, in particular different types of cut meat products and sausage products, in at least one base portion of a packaging, wherein the apparatus has at least two food feeds. The invention furthermore also relates to a packaging receiver for the apparatus.

In order to be able to compile a platter filled with different types of meat, sausage, cheese, fish and/or other foods as a consumer and to be able to offer it to guests, for example, different packagings of the individual foods typically have to be purchased and compiled again, with typically only some of the purchased foods being used. There is therefore an interest in offering the consumer fully compiled platters with corresponding foods, i.e. foods in finished portions, for example cut into slices, in an appealing exterior.

If, however, a plurality of foods are to be arranged together in one packaging, they typically have to be compiled by hand in a complex manner and placed into the packaging. In particular if the food or one of the foods should be offered cut into slices in finished portions. A machine arrangement of such products is not possible, or is at least not economically possible, with the known apparatus since they cannot be coordinated with one another or can only be coordinated with one another with difficulty.

It is the object of the invention to provide a solution with which a plurality of foods can be arranged in a packaging in a desired manner, i.e. aligned in the packaging.

This object is satisfied by a method having the features of claim 1, by an apparatus having the features of claim 6 and by a packaging machine having the features of claim 16. Further developments and advantageous embodiments of the invention are set forth in the respective subordinate dependent claims.

The method for arranging a plurality of foods, in particular different types of cut meat products and sausage products, in at least one base portion of a packaging is characterized in accordance with the invention in that the base portion receiving the food is moved on a guide track, wherein magnetic fields are generated for moving a cart; in that the cart is supplied successively to food supplies of the individual foods; and in that at least one food is placed on or in the base portion at each food feed. In this respect, a conveying speed and a precision in the moving of the base portions of the packagings is achieved with the magnetic fields by which a direct linking of the individual food feeds is made possible. The individual foods portioned before the placing in the base portion of the packaging are then placed in base portions previously respectively provided and aligned in a designed manner. A desired number of, for example, fully cut slices of the food is thus provided for the respective packaging at each of the food feeds.

In this respect, at least one of the foods preferably comprises slices which are placed at least partly overlapping one another on or in the base portion. All foods can in particular also be arranged in slices at least partly overlapping one another. Alternative arrangements can relate to pieces of individual foods arranged next to one another, in particular pieces aligned in parallel or in arcuate form with respect to one another, or can also relate to dips, sauces or the like matching the foods which are arranged within the packaging in dependence on their consistency in correspondingly separate placement regions or containers. The differently shaped foods and arrangements can furthermore also be mixed among one another.

In order to be able to align the different foods directly in a mutually desired manner, provision is furthermore made that the base portions of the packagings are rotated at or in front of the individual food feeds. Individual tracks of mutually overlapping slices of the foods can thus be aligned, for example, at an angle, in particular at an angle of 90°, to other tracks arranged on or in the base portion. For this purpose, the base portions of the packagings are rotated about a substantially vertical axis, with their bases being held as much as possible in a horizontal plane so that a sliding of already placed down foods is avoided on rotation.

Mutually overlapping slices are advantageously placed in parallel with a predefined conveying direction of the guide track on or in the base portion so that they do not undergo any change of direction on being placed down.

It may optionally be necessary in this respect that the base portions are stopped at the food feeds on the guide track while they are being filled. Whether the base portions have to be stopped or alternatively slowed down at the food feeds in this respect depends on the intervals of the respective food feeds from one another, on the shape and arrangement of the foods and on the conveying speed of the base portions, etc.

Once the base portions have been completely filled with the respective provided foods, provision is made in accordance with a further development that the base portions are pushed away from carts transporting them and are fed to a closing of the packaging. The base portions of the packaging are then transferred to a closing device disposed downstream of the guide track before the packaging is closed. In accordance with an alternative further development, the base portions of the packagings can, however, also be closed on the guide track by a closing device disposed downstream of the food feeds in the conveying direction of the guide track and the packagings then fully packed are removed from the guide track. Instead of pushing the closed packagings away from the cart, they could then also be picked by means of suction cups, grippers or the like and removed from the carts.

The apparatus for arranging a plurality of foods, in particular different types of cut meat products and sausage products, in at least one base portion of a packaging comprising at least two food feeds is characterized in accordance with the invention in that a respective food transfer end of each of the food feeds is associated with a guide track on which carts can be moved by means of magnetic field sources; in that at least the food transfer ends of the food feeds are arranged above the guide track; and in that the carts have packaging receivers having at least one receiving frame. The foods to be arranged in the packagings thus arrive in or on the base portions of the packagings provided beneath the food transfer ends by means of the carts in a simple manner due to gravity. It is in this respect ensured by the magnetic field sources that the base portions to be filled can be moved between the individual food feeds at a sufficient conveying speed so that a cart having a base portion can always be provided beneath a food transfer end of the food feeds when foods are transferred.

To ensure that the base portions are held securely in the receiving frame, provision is made that the receiving frame has a shape matched to the base portion to be received. This matched shape can comprise in a further embodiment that at least corners of the receiving frame are arranged at intervals from one another corresponding to dimensions of corners of a respective base portion to be received. In a further embodiment of the invention, the receiving frame can also be configured as a receiving depression. The outer wall of the base portion then advantageously completely contacts the receiving depression, with the receiving depression than having a shape which at least sectionally corresponds to a negative of the outer dimensions of the base portion to be received. In addition, the inserted base portion and the receiving depression then have the advantage of respective openings extending in a common plane.

A cart holding point of the guide track can furthermore be associated with at least one of the food feeds. A corresponding cart holding point has to be provided, for example, when the base portion of the packaging movable by the cart has to be stopped for the filling thereof. Such a cart holding point is in particular arranged with each food feed. Additional cart holding points can additionally be provided to prevent tailbacks or crashes of individual carts. Alternatively, the carts with the packagings can also be braked by a suitable control and can be moved beneath the food transfer ends at reduced speed.

The guide track and at least one of the food feeds in a preferred embodiment have conveying directions at least beneath the food transfer ends which extend very largely in parallel with one another, i.e. in parallel above one another, with the food feed being arranged above the guide track. This arrangement of guide track and food feed above all relates to food feeds configured as conveyor belts or the like which are advantageously all arranged with respect to one another in this manner and serve the feed of foods of stable shape, in particular slices of meat, sausage, cheese, fish, etc. Food feeds are in particular also suitable for pasty foods such as dips which are configured as feed lines arranged at least sectionally perpendicularly above the guide track.

A preferred installation of the apparatus then results from this in a production sector in which all food feeds configured as conveyor belts and treatment processes positioned upstream thereof are arranged in parallel next to one another and the guide track is compiled of a plurality of sections angled at right angles to one another. These sections are guided successively alternately to the left and to the right so that each second section of the guide track has a conveying direction the same as the conveying direction of the respective associated food feed whose food transfer ends are offset from one another in accordance with the length of the sections guided in parallel with the food feeds.

To allow the individual foods to be aligned in a desired manner with respect to one another on the arrangement, provision is furthermore made that the receiving frame is rotatable with respect to a lower construction of the packaging receiver. The receiving frame can thus be rotated in a horizontal plane, or at least in a substantially horizontal plane, in order, for example, to be able to place foods to be arranged at an angle to one another in or on the base portion.

The rotatability of the receiving frame can in this respect be ensured in accordance with a first embodiment in that the packaging receiver has a rotation device having a drive. The rotation device and the drive thus form a unit and are arranged as an assembly of the packaging receiver on the cart.

Provision is made in accordance with a second embodiment that the packaging receiver has a rotation device which can be actuated from the outside via at least one drive associated with the guide track. A drive is accordingly to be provided at each position of the guide track at which a rotation of the base portion is required. The drives associated with the guide track are then advantageously arranged before or directly at the respective food feeds at the guide track in the conveying direction of the guide track. In a further embodiment, the rotation devices of the packaging receivers then have an outwardly disposed, advantageously peripheral sprocket into which the at least one drive engages. The drive itself then does not necessarily also have to be driven itself, but can rather, for example, comprise projections which engage into the sprocket and by which a positive guide of the packaging receiver is ensured and which rotate it at a predefined angle to the cart. The drive, in particular each of the drives, thus comprises at least one static part which has the projections and which is preferably mounted at the guide track or at a rack thereof.

The packing receivers can furthermore have an ejection mechanism with which a received packaging can be pushed out of the receiving frame. The packagings can thus be transferred, for example, to a conveyor belt of a closing apparatus in a simple manner and without having to provide additional means or apparatus. Instead of transferring the open packagings to a closing apparatus, they can also be held in the receiving frames, can be closed, for example by a film to be applied, and can subsequently be conveyed onward via a corresponding ejection mechanism or via an external lifting device, grippers or the like. The film then forms a top portion of the packaging.

The invention furthermore relates to a packaging receiver for the above-named apparatus. This is characterized in that it has at least one receiving frame and in that it has fastening means for at least one cart which can be moved on a guide track by means of generated magnetic fields. The fastening means can, for example, be configured as one or more installation plates which are adapted to the respective cart or carts on which the packaging receiver is to be fastened. The fastening means then represent a lower construction of the packaging receiver on which the remaining packaging receiver is built up. In this respect, a single-part or multipart means for guiding the packaging mount of the guide track is defined as the cart.

Figure 2:
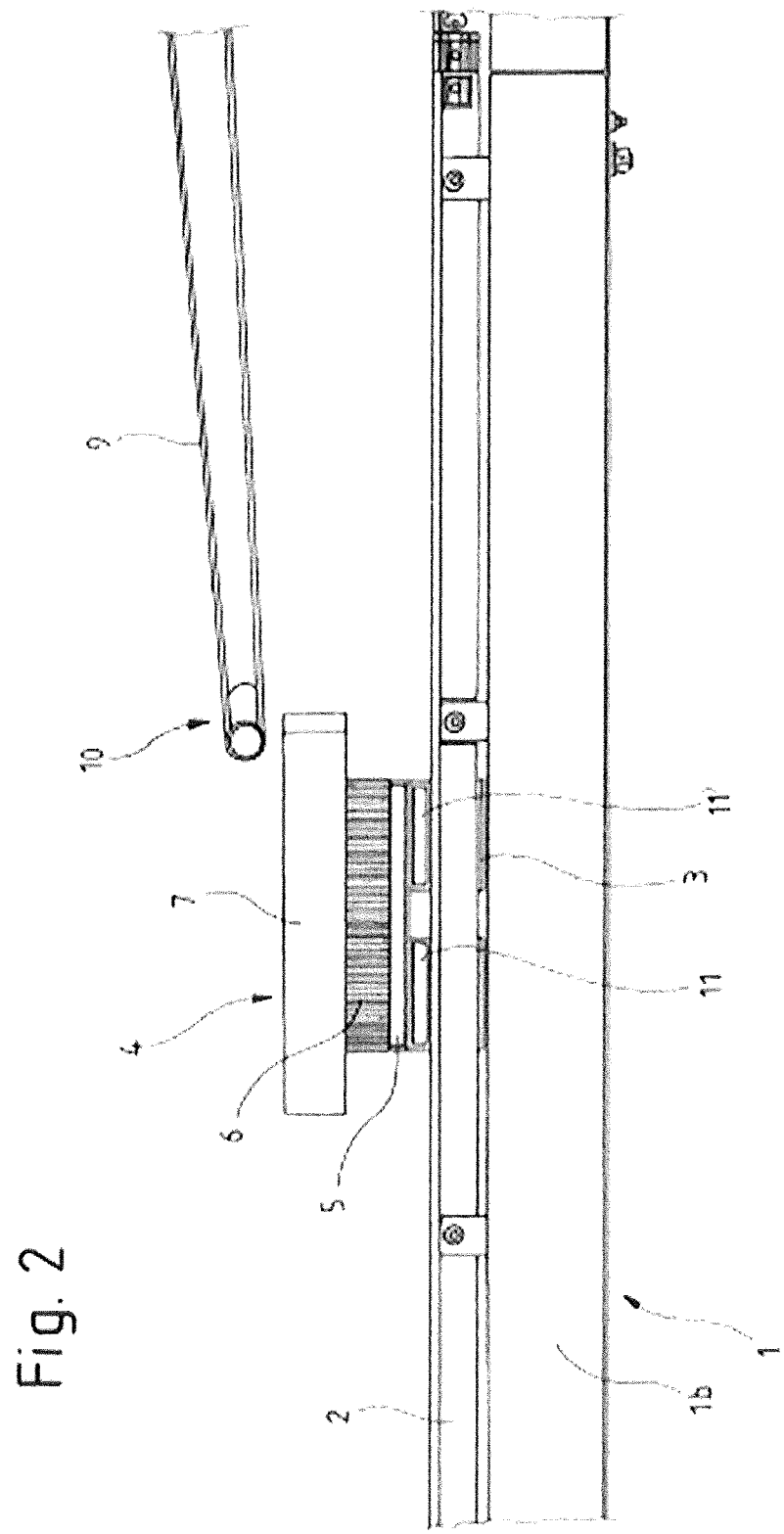
Figure 3:
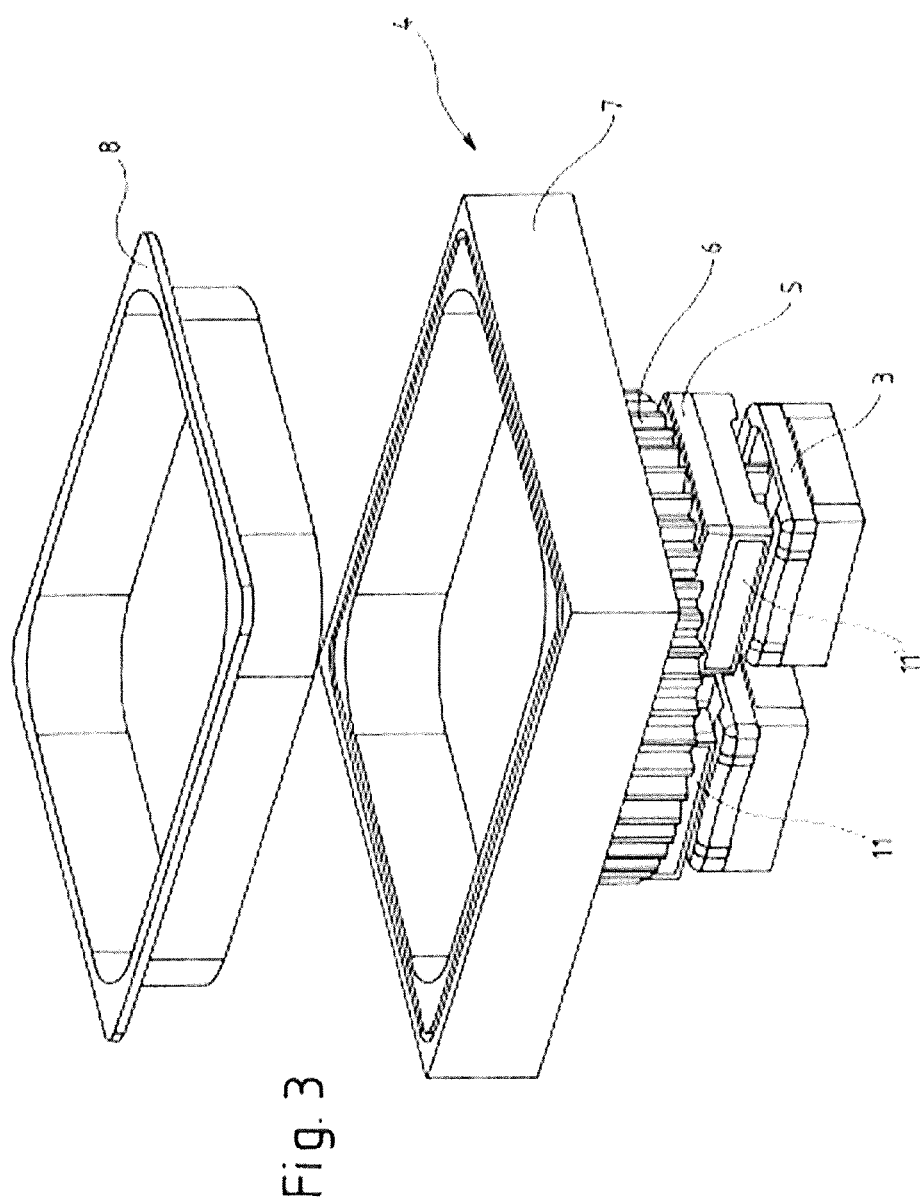

An embodiment of the invention from which further features material to the invention can be seen is shown in the drawing. There are shown:

FIG. 1: a perspective view of a part of an apparatus in accordance with the invention with a guide track and a food feed;

FIG. 2: a side view of a section of the apparatus in accordance with FIG. 1; and FIG. 3: a perspective view of a packaging receiver in accordance with the invention on a cart.

The part of the apparatus shown in FIG. 1 shows a guide track 1 which has two guide rails 2 arranged in parallel with one another. They bound a lane formed at the guide track 1 at the margin side and have end sections curved with respect to one another at their free ends. A cart 3 having a packaging receiver 4 is held movable between them in the lane.

The packaging receiver 4 comprises a lower construction 5, a rotation device 6 and a receiving frame 7 which is rotatably supported via the rotation device 6 with respect to the lower construction 5 and the cart 3. A base portion 8 of a packaging is additionally received in the receiving frame 7.

The guide track 1 is further composed of three straight sections 1a, 1b, 1c, wherein adjacent sections are each arranged at right angles to one another in the conveying direction from 1a over 1b to 1c and are connected to one another via a respective cam part 1d, 1e. The sections 1a and 1c are accordingly aligned offset in parallel with one another. Furthermore, a food feed 9 configured as a conveyor belt can be seen above the section 1b in FIG. 1 which is arranged in parallel with the section 1b so that foods lying on the food feed 9 and carts 3 movable on the guide track 1 can be conveyed in the same direction in parallel with one another.

A detailed view of the food feed 9 with its food transfer end 10 is shown in FIG. 2. The food transfer end 10 in this respect represents the region of the food feed 9 closest to the packaging receiver 4 so that a small drop height by means of gravity of foods to be placed in or on a base portion 8 of a packaging is ensured. The packaging receiver 4 is shown in detail in FIG. 3, with the packaging receiver 4 being connected by fastening means formed at the lower construction 5 to installation plates 11, 11' of the two-part cart 3. The rotation device 6 is fastened to the lower construction 5 and has a sprocket which is rotatably supported with respect to the lower construction 5, which is at the outer side and which is rotatable with respect to the cart 3 by means of static drives associated with the guide track 1. The rotation device 6 is arranged between the lower construction 5 and the receiving frame 7. The receiving frame 7 is configured in the embodiment shown as a receiving depression whose dimensions correspond to a negative of the base portion 8 to be received and which can completely receive it. The inserted base portion 8 and the receiving depression accordingly each have an opening in the same plane.

In order now to arranged a plurality of foods in the base portion 8, a plurality of the parts of the apparatus shown in FIG. 1 are to be arranged behind one another so that the cart with the packaging is fed successively over the guide track 1 to the individual food feeds 9 and is respectively loaded with a food. The guide track 1 is in this respect to be configured as a continuous belt, i.e. the respective first section 1a and the last section 1c are connected to one another via a further section of the guide track 1.

All the features named in the above description and in the claims can be combined in any desired selection with the features of the independent claim. The disclosure of the invention is thus not restricted to the described or claimed feature combinations; all feature combinations sensible within the framework of the invention are rather to be considered as disclosed.

The invention claimed is:

1. A method for arranging a plurality of foods in at least one base portion of a packaging,
   the method comprising:
   moving the base portion receiving the foods on a guide track, with magnetic fields being generated for moving the base portion;
   successively feeding a cart to food feeds of the individual foods, the cart having a packaging receiver having at least one receiving frame, the receiving frame having a shape adapted to the base portion to be received, the receiving frame rotatable with respect to a lower construction of the packaging receiver; and
   placing at least one food on or in the base portion at each food feed.

2. The method in accordance with claim 1,
   wherein the food comprises different types of cut meat products and sausage products.

3. The method in accordance with claim 1,
   further comprising:
   placing at least one of the foods on or in the base portion in at least partly mutually overlapping slices.

4. The method in accordance with claim 1,
   further comprising:
   rotating the base portions of the packagings at or before the individual food feeds.

5. The method in accordance with claim 1,
   further comprising:
   stopping the base portions on the guide track at the food feeds while they are being filled.

6. The method in accordance with claim 1,
   further comprising:
   pushing away the base portions from a cart transporting them and movable on the guide track after the filling and
   feeding the filled base portions to a closing of the packaging.

7. An apparatus for the arranging of a plurality of foods in at least one base portion of a packaging having at least two food feeds, wherein
   a respective food transfer end of each of the food feeds is associated with a guide track on which carts can be moved by means of magnetic field sources;
   wherein at least the food transfer ends of the food feeds are arranged above the guide track; and
   wherein the carts have packaging receivers having at least one receiving frame, wherein the receiving frame has a shape adapted to the base portion to be received, the receiving frame rotatable with respect to a lower construction of the packaging receiver.

8. The apparatus in accordance with claim 7,
   wherein the food includes different types of cut meat products or sausage products.

9. The apparatus in accordance with claim 7,
   wherein the receiving frame is configured as a receiving depression.

10. The apparatus in accordance with claim 9,
    wherein the receiving depression has a shape which corresponds to a negative of the outer dimensions of the base portion to be received.

11. The apparatus in accordance with claim 7,
    wherein a cart holding point of the guide track is associated with at least one of the food feeds.

12. The apparatus in accordance with claim 7,
    wherein the packaging receiver has a rotation device having a drive.

13. The apparatus in accordance with claim 7,
    wherein the packaging receiver has a rotation device which can be actuated from the outside via at least one drive associated with the guide track.

14. The apparatus in accordance with claim 13,
    wherein the drives associated with the guide track are arranged at the guide track in a predefined conveying direction of the guide track before or directly at the respective food feeds.

15. The apparatus in accordance with claim 7,
    wherein the packaging receivers have an ejection mechanism with which a received base portion can be pushed out of the receiving frame.

16. A packaging receiver for an apparatus for the arranging of a plurality of foods in at least one base portion of a packaging having at least two food feeds, in which apparatus a respective food transfer end of each of the food feeds is associated with a guide track on which carts can be moved by means of magnetic field sources; in which apparatus at least the food transfer ends of the food feeds are arranged above the guide track; and in which apparatus the carts have packaging receivers having at least one receiving frame,
   the packaging receiver comprising at least one receiving frame, the receiving frame having a shape adapted to the base portion to be received, the receiving frame rotatable with respect to a lower construction of the packaging receiver; and
   fastening means for at least one cart movable on the guide track by means of generated magnetic fields.

* * * * *